United States Patent Office 3,582,316
Patented June 1, 1971

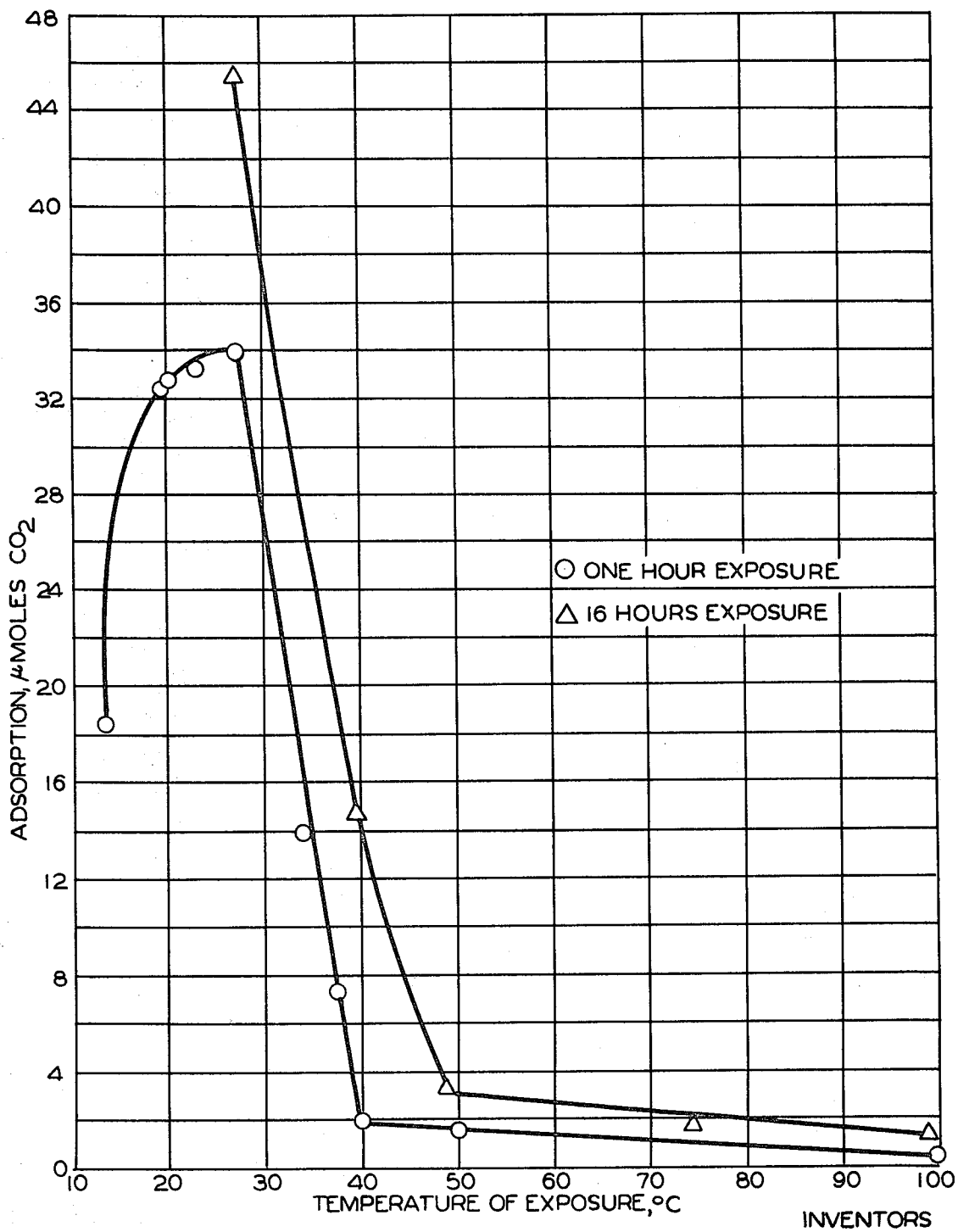

3,582,316
PROCESS FOR STORING PARTIALLY
OXIDIZED LEAD POWDERS
George A. Parker, Cheswick, and Robert S. Bowman,
Pittsburgh, Pa., assignors to St. Joseph Lead Company,
New York, N.Y.
Filed May 3, 1968, Ser. No. 726,410
Int. Cl. B22f 3/02, 3/10
U.S. Cl. 75—.5A
3 Claims

ABSTRACT OF THE DISCLOSURE

The adsorption of carbon dioxide by partially oxidized lead power during storage and handling in air is minimized by maintaining the powder at a temperature above 50° C.

---

This invention relates to a method for controlling the adsorption of carbon dioxide by partially oxidized lead powder.

It is known that the physical properties of lead may be enhanced markedly by dispersing within the lead insoluble particles of solid substances such as an oxide or oxides of lead or other oxides such as alumina, magnesia and lime, metals or metallic alloys such as copper, cobalt, nickel and iron-cobalt alloys, and carbon. In general, the added substances are coated on or admixed with lead particles and the body of lead particles containing such admixtures or coatings is subject to plastic deformation to comminute the solid substance and to disperse the comminuted substance in the lead matrix.

Of particular interest are the products obtained by dispersing within the lead insoluble particles of an oxide or oxides of leads. Such products are made by subjecting finely divided lead to conditions under which a coating of oxide is formed on the surface of the lead particles as by atomizing molten lead in an oxidizing atmosphere, such as air, or by subjecting lead particles to the action of an oxidizing gas under controlled conditions, for example, by stirring the lead particles in air in the presence of controlled amounts of moisture. In general, the oxide-coated lead particles should not exceed about 150 microns in size and preferably should not exceed an average particle size of about 20 microns. A body of thus treated lead particles is subjected to plastic deformation, for example, by rolling or extrusion to comminute the lead oxide coating thereon and to disperse the comminuted lead oxide in the lead matrix.

In the conventional methods of handling and storing partially oxidized lead powder, there usually occurs an undesired take-up of carbon dioxide and water vapor by the powder to form lead carbonate and hydrated compounds on the surface of the lead particles. When dispersion strengthened lead prepared from such particles is heated, usually just below its melting point, a bubbling effect is observed. This bubbling is attributed in part to the release of internally generated gases resulting from the heat-induced decomposition of lead compounds such as the carbonate. Whatever the actual cause for the gas generation may be, the practical fact is that this effect causes difficulty in hot working, for example, rolling, forging and extruding, where heat is generated during processing or where the material is preheated prior to being subjected to the working process. More importantly, it imposes drastic restrictions on the joinability of dispersion strengthened lead parts by conventional welding techniques. Heating of the areas to be joined induces the bubbling effect and leads to an incomplete closure of the joint. Such an imperfect joint may suffer corrosion in certain uses, for example, where a dispersion strengthened lead sheet is used as a plate in a storage battery with a sulfuric acid anolyte.

It is, therefore, a principal object of the present invention to provide an improved process for the handling and storage of partially oxidized lead powder prior to manfacture into dispersion strengthened lead which minimizes the adsorption of carbon dioxide by the powder during storage. This and other desirable objects and advantages of the present invention will be illustrated by means of the following discussion and examples and by the drawing which is a plot of the temperature dependence of carbon dioxide adsorption by partially oxidized lead powder.

The process of the present invention is based upon the discovery that the adsorption of carbon dioxide by partially oxidized lead powders is remarkably sensitive to temperature. We have discovered that the adsorption of carbon dioxide decreases sharply at temperatures above about 28° C. At temperatures above 50° C., the adsorption of carbon dioxide is minimal even for extended periods of exposure under conditions conducive to such adsorption, i.e., even in the presence of moisture.

The discovery of the present invention is readily integrated into conventional processes for the manufacture of dispersion strengthened lead. Carbon dioxide-free partially oxidized lead powder as it emerges from the oxidation unit is transported and stored in ordinary air without adsorbing deleterious amounts of carbon dioxide and water vapor by maintaining the temperature of the powder above 50° C., temperatures in the range of 50–100° C. are preferred. While more elevated temperatures up to just below the melting point of the powder (350–370° C.) are also effective in preventing carbon dioxide adsorption, storage at these higher temperatures is generally not utilized. Maintaining the powder at higher temperatures is more costly and is impractical in terms of the limited improvement obtained.

The principles underlying our invention are further illustrated by means of the following examples:

EXAMPLE 1

Samples of partially oxidized lead powder containing 1.0% by weight of PbO where desorbed under a vacuum of $10^{-3}$–$10^{-4}$ torr at temperatures just below their melting point (about 380° C.) to remove the adsorbed gases and then cooled while still under vacuum to the desired test temperatures. In each test, a stream of air adjusted to the desired carbon dioxide and moisture content was flowed over the desorbed test sample for the predetermined period of time. Each exposed sample was degassed to equilibrium under vacuum at the temperature of exposure and then heated at a programmed rate to 380° C. under continuous vacuum continuously measuring and recording the amount of expelled gases as a function of temperature. The total amount of desorbed gases, mostly carbon dioxide are indicative of the gases adsorbed during exposure.

The drawing contains plots of representative test results on the amount of adsorption versus temperature of exposure at the indicated temperatures. The plots shown were run with air of moisture content equivalent to 100% relative humidity and containing 1200 parts per million of carbon dioxide at a flow rate of 25 ml. per minute. (Moist air is employed because previous experiments have indicated that the presence of moisture enhances carbon dioxide adsorption). These experiments indicate that carbon dioxide adsorption falls off rapidly at temperatures above 28° C. and reaches minimal levels at temperatures in the range 50–100° C.

EXAMPLE 2

Molten lead particles not exceeding about 150 microns in size were atomized at about 400° C. into a stream of preheated air. The lead particles oxidized rapidly under these conditions; the extent of oxidation was controlled so that the surface coating of lead oxide was the desired 1.0% by weight of oxide calculated as PbO. The resultant particles of carbon dioxide-free, partially oxidized lead powder were then stored under air at 50–100° C. Only minimal quantities of carbon dioxide were absorbed by the particles under these conditions.

When partially oxidized lead powder prepared as above was stored in ordinary air at ambient temperatures, i.e., below 50° C., considerable carbonation of the powder was observed.

The oxide coated lead particles transported and stored according to the method of the present invention can be compacted and rolled or extruded to form dispersion strengthened lead. Articles made from such dispersion strengthened lead may be hot-rolled or fusion welded without bubbling or development of undesirable porosity in the treated article.

The present invention has been illustrated by means of examples describing the preparation, handling and storage of carbon dioxide-free partially oxidized lead powder particularly suitable for use in the manufacture of dispersion strengthened lead. It is apparent that the process of the present invention is generally useful in minimizing carbon dioxide absorption by partially oxidized lead particles and our invention is as described in the claims.

We claim:
1. In the production of dispersion strengthened lead by partially oxidizing lead powder and thereafter subjecting the partially oxidized powder to plastic deformation, the improvement which comprises maintaining the partially oxidized lead powder at a temperature above 50° C. between the partial oxidation thereof and the plastic deformation thereof to improve the weldability of the resulting lead by minimizing absorption of carbon dioxide by the partially oxidized powder.

2. A method according to claim 1 wherein the temperature is in the range 50–100° C.

3. A method according to claim 1 wherein the particles contain about 1% by weight of lead oxide as PbO and average less than 150 microns in size.

References Cited

UNITED STATES PATENTS

| | | | |
|---|---|---|---|
| 1,156,079 | 10/1915 | Holley | 75—0.5 |
| 3,315,342 | 4/1967 | Roberts | 75—206 |
| 3,320,664 | 5/1967 | Krantz et al. | |

L. DEWAYNE RUTLEDGE, Primary Examiner

W. W. STALLARD, Assistant Examiner

U.S. Cl. X.R.

21—2.5; 75—211; 264—6, 111